United States Patent [19]

Hamburg et al.

[11] 4,085,719
[45] Apr. 25, 1978

[54] VAPOR PRESSURE REGULATOR FOR A VAPORIZED LIQUID FUEL SYSTEM

[75] Inventors: Douglas R. Hamburg, Birmingham; Dante S. Giardini, Dearborn, both of Mich.

[73] Assignee: Ford Motor Company, Dearborn, Mich.

[21] Appl. No.: 660,285

[22] Filed: Feb. 23, 1976

[51] Int. Cl.² ............................................. F02B 43/00
[52] U.S. Cl. .............................. 123/122 E; 137/177; 220/85 B
[58] Field of Search .............. 123/3, 133, 34 R, 34 A, 123/35, 122 E, 120; 48/102 A; 180/54 B; 220/85 VR, 85 VS, 85 B; 137/173, 177, 179

[56] References Cited

U.S. PATENT DOCUMENTS

| | | | |
|---|---|---|---|
| 1,871,302 | 8/1932 | Carroll | 123/133 |
| 2,394,401 | 2/1946 | Overbeke | 220/85 B |
| 2,849,150 | 8/1958 | Tompkins, Jr. | 220/85 VR |
| 3,306,273 | 2/1967 | Dolphin | 123/133 |
| 3,903,708 | 9/1975 | Mair | 220/85 VR |
| 3,948,224 | 4/1976 | Knapp et al. | 123/3 |

FOREIGN PATENT DOCUMENTS

159,044 6/1940 Germany ................................ 123/3

*Primary Examiner*—Charles J. Myhre
*Assistant Examiner*—Tony M. Argenbright

*Attorney, Agent, or Firm*—Robert A. Benziger; Keith L. Zerschling

[57] ABSTRACT

A vapor reservoir adapted for use in conjunction with a vaporized liquid fuel system for an internal combustion engine is disclosed. The reservoir includes a movable wall member cooperative with means defining a housing to establish a variable volume vapor storage space. The movable wall member is referenced to the pressure of the air immediately upstream from the intake to the air and fuel metering portion of the engine. The housing includes a generally downwardly depending condensate collecting and return section. Vapor delivery conduits are positioned within the housing and support a thermally floating finned member operative to disperse vapor delivered to the vapor reservoir. The movable wall member is provided with position sensing means operative to provide an input to an electrical circuit for controlling the rate of vapor delivery to maintain a predetermined quantity of vapor within the vapor space.

The electronic circuitry is operative to control a liquid fuel delivery means to provide quantities of liquid fuel to a liquid fuel vaporizer for charging the vapor storage space of the vapor reservoir. The electrical circuit is operative to vary a threshold voltage in response to the sensed position of the movable wall member. The variable threshold voltage is compared to a saw tooth wave train to generate a variable duration voltage pulse in order to selectively control the coarse liquid fuel delivery means.

5 Claims, 3 Drawing Figures

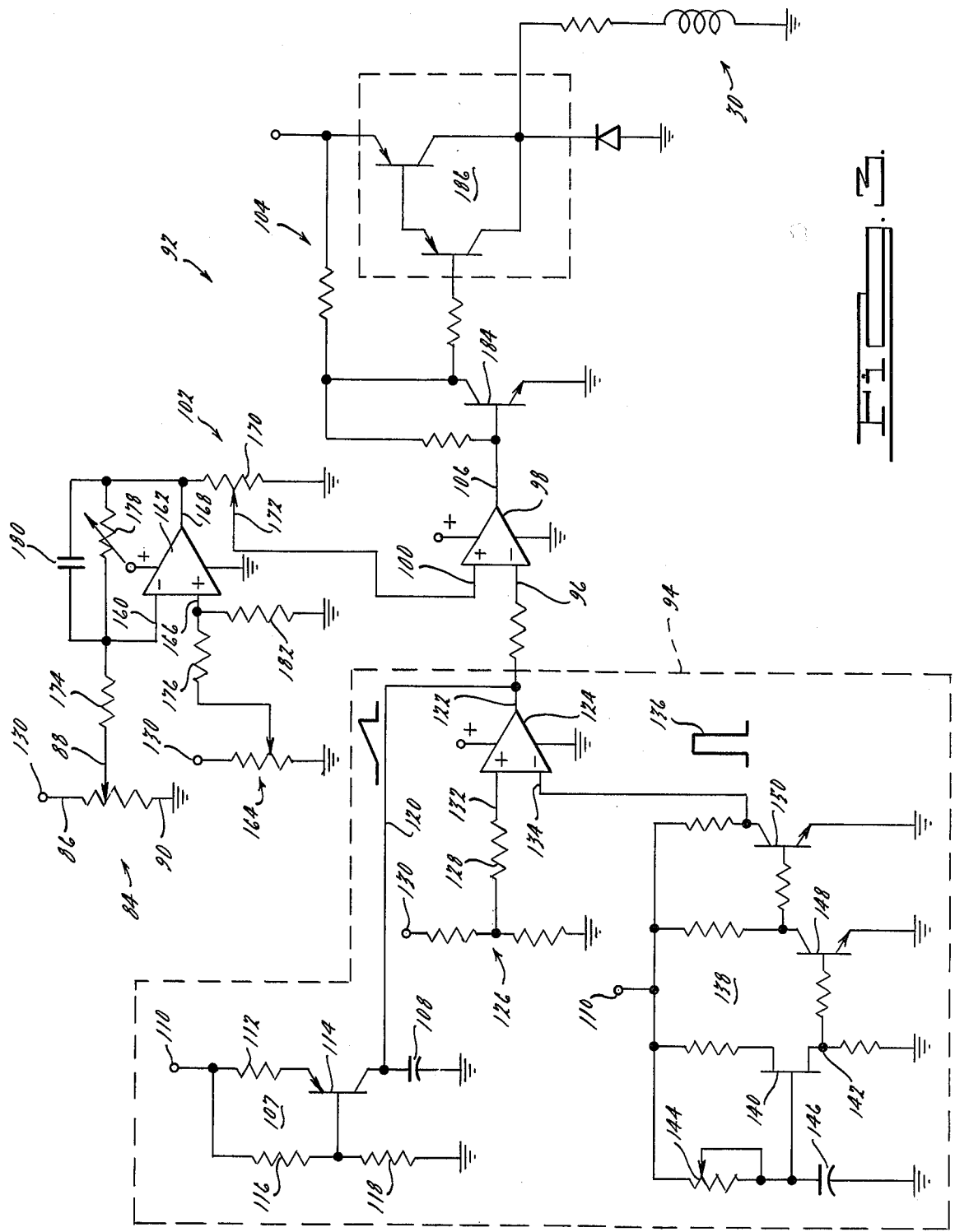

VAPOR PRESSURE REGULATOR FOR A VAPORIZED LIQUID FUEL SYSTEM

CROSS REFERENCE TO RELATED APPLICATION

This application is related to copending commonly assigned patent application Ser. No. 660,281 filed on Feb. 23, 1976 in the names of J. E. Auiler et al. and titled "Vaporized Liquid Fuel Delivery and Metering System".

BACKGROUND OF THE INVENTION

The present invention is directed to the field of internal combustion engine fuel delivery and metering systems. In particular, the present invention is directed to that portion of the above-noted field which is concerned with the delivery and metering of a liquid fuel to provide a combustible air/fuel mixture for an internal combustion engine. More particularly, the present invention is directed to that portion of the above-noted field which is concerned with the delivery and metering of a liquid fuel which has been vaporized prior to mixture with an intake air stream. More particularly still, the present invention is directed to that portion of the above-noted field which is concerned with the storage of quantities of vaporized liquid fuel. More particularly still, the present invention is directed to that portion of the above-noted field which is concerned with the storage of a quantity of vaporized liquid fuel sufficient to assure an adequate supply of fuel to an internal combustion engine. More particularly still, the present invention is directed to that portion of the above-noted field which is concerned with the storage of a vaporized liquid fuel under conditions which will maintain substantial quantities of the vaporize liquid fuel in vapor form for delivery, in vapor form, to an internal combustion engine. More particularly still, the present invention is directed to that portion of the above-noted field which is concerned with the maintenance of a quantity of vaporized liquid fuel within a vapor reservoir to assure an adequate supply of vaporized liquid fuel for an otherwise conventional automotive-type internal combustion engine.

DESCRIPTION OF THE PRIOR ART

It is known that a liquid fuel may be advantageously converted to a vapor for mixture with air to establish a combustible air/fuel mixture for delivery to an internal combustion engine. However, prior art teachings with respect to the delivery of a vaporized liquid fuel from a source of liquid fuel to an internal combustion engine have not adequately treated the technical question of how to maintain a supply of vaporized liquid fuel which supply is adequate for substantially all conditions of engine operation. It is therefore a specific object of the present invention to provide a vapor reservoir for receipt of a vaporized liquid fuel and for storage of the vaporized liquid fuel in vapor form for eventual delivery to an internal combustion engine. The prior art has also not adequately treated the question of how to maintain a supply of vaporized liquid fuel under conditions which will allow maintenance of a substantially constant air/fuel ratio under substantially all conditions of engine operation. It is therefore a specific objective of the present invention to provide a vapor storage reservoir for automatically maintaining a desired air/fuel ratio.

The mass of fuel required to be delivered to an internal combustion engine may vary over mass flow rates of about 20:1. It will be appreciated that a vapor reservoir for a vaporized liquid fuel system could, on the one hand, be designed to store adequate quantities of vaporized liquid fuel under the extreme fuel consumption conditions. However, this approach could result in an unnecessarily large accumulation of vaporized liquid fuel within the reservoir. Furthermore, since the conventional liquid fuel is gasoline which may be expected to be completely vaporized at temperatures of about 425° F., it will be appreciated that a vapor reservoir designed to maintain excessively large quantities of liquid fuel in vaporized form would have to be heated to a relatively high temperature in order to avoid the condensation and accumulation of condensed fuel. It is therefore a further and specific object of the present invention to provide a vapor reservoir which includes means for controlling the rate of delivery of vaporized liquid fuel to the vapor reservoir. More particularly still, it is an object of the present invention to provide an electronic means responsive to the quantity of vapor residing or contained within a vapor reservoir operative to control the delivery of additional quantities of vapor to the vapor reservoir.

A vapor reservoir intended for use in conjunction with an automotive type internal combustion engine would be expected to be fabricated from relatively inexpensive and available materials such as metal. It is appreciated that the fabrication of a vapor reservoir out of such a material will result in a structure having a relative high coefficient of thermal conductivity over a substantial surface area which would promote condensation of a vaporized liquid fuel. It is therefore a further and specific object of the invention to provide a vapor reservoir for a vaporized liquid fuel delivery and metering system which is designed to inhibit condensation of the vaporized liquid fuel. More specifically, it is an object of the present invention to provide a vapor inlet structure for a vapor reservoir which promotes mixing of the relatively higher temperature inlet vapor with potentially lower temperature vapors residual within the vapor reservoir.

In achieving the foregoing objective, one would ordinarily expect to introduce the relatively higher temperature inlet vapor at the lowest point within the vapor reservoir to intermix with, and elevate the temperature of, the vapor residing at the lowest point in the vapor reservoir which vapor would be expected to be the lowest temperature vapor. In fabricating such a vapor reservoir one would also attempt to remove the condensate of any vapor which had condensed within the vapor reservoir. Such condensate would be expected to accumulate, in liquid form, in the lowest portion of the vapor reservoir. It is therefore, a further and specific object of the present invention to provide means defining a thermal barrier, for receipt within the lowest portion of the reservoir housing, to separate the relatively higher temperature inlet vapors from any relatively lower temperature condensed liquid fuel.

SUMMARY OF THE PRESENT INVENTION

The present invention provides a reservoir for receipt and storage of a vaporized liquid fuel. The volume of the vapor storage reservoir is arranged to be approximately one-half of the total displacement of the combustion chambers of the associated engine. The interior of the vapor reservoir is communicated to the intake system of an internal combustion engine for delivery thereto of a quantity of a vaporized liquid fuel. Vapor is stored within the vapor reservoir at a pressure which equals or closely approximates the pressure existing immediately upstream from the intake system of the associated internal combustion engine. The vapor storage reservoir is provided with a movable wall portion which is referenced to the air pressure immediately upstream from the intake to the associated engine. The vapor storage reservoir is also provided with vapor delivery control means which are responsive to the position of the movable wall portion to increase or decrease the rate of vapor delivery to the vapor reservoir. The vapor reservoir includes a housing member having a downwardly depending, cup-shaped portion for the collection and drainage of any condensed vapors. Vapor delivery to the reservoir is arranged to be through the dependent cup-shaped portion. A thermally floating thermal barrier is arranged within the dependent cup-shaped portion for separating inlet vapor from any condensed vapor. The thermally floating portion includes swirl inducing fin members which are operative to promote mixing of the relatively higher temperature inlet vapor with potentially lower temperature vapor residual within the vapor reservoir.

The vapor delivery control means includes a liquid fuel metering means in the form of a valve adapted to regulate and control, in a coarse fashion, the rate of delivery of the liquid fuel to the liquid vaporizer in order to control the rate of delivery and accumulation of vaporized liquid fuel within the vapor reservoir. An electronic circuit is arranged to be responsive to means indicative of the position of the movable wall member. The electronic circuit is operative to generate a control signal for application to the coarse liquid fuel metering means to controllably vary the rate of liquid fuel delivery to the heating means.

Electrical means in the form of a potentiometer are arranged to generate an output signal which is indicative of the position of the movable wall member. An electronic circuit means is arranged to receive the potentiometer signal and to compare this signal with a reference voltage to determine the need for an increase or a decrease in the rate of delivery of liquid fuel to the heating or vaporizing means. Additionally, the circuit includes electrical means arranged to be responsive to the position of the engine throttle valve member to selectively increase or decrease the rate of liquid fuel delivery to the vaporizing means in anticipation of change in the rate of consumption of the vaporized liquid fuel by the associated engine. These last mentioned means also are operative to prevent closed loop stability in the control loop which includes the coarse fuel delivery metering means, the liquid fuel vaporizer, the vapor reservoir and the electrical vapor delivery control circuit which controls the coarse delivery metering means as a function of the position of the movable wall member.

BRIEF DESCRIPTION OF THE DRAWINGS

FIG. 3 illustrates the electrical control circuit for maintaining an adequate supply of vaporized liquid fuel in the vapor reservoir according to FIG. 1.

DESCRIPTION OF THE PREFERRED EMBODIMENT

Figure 1:
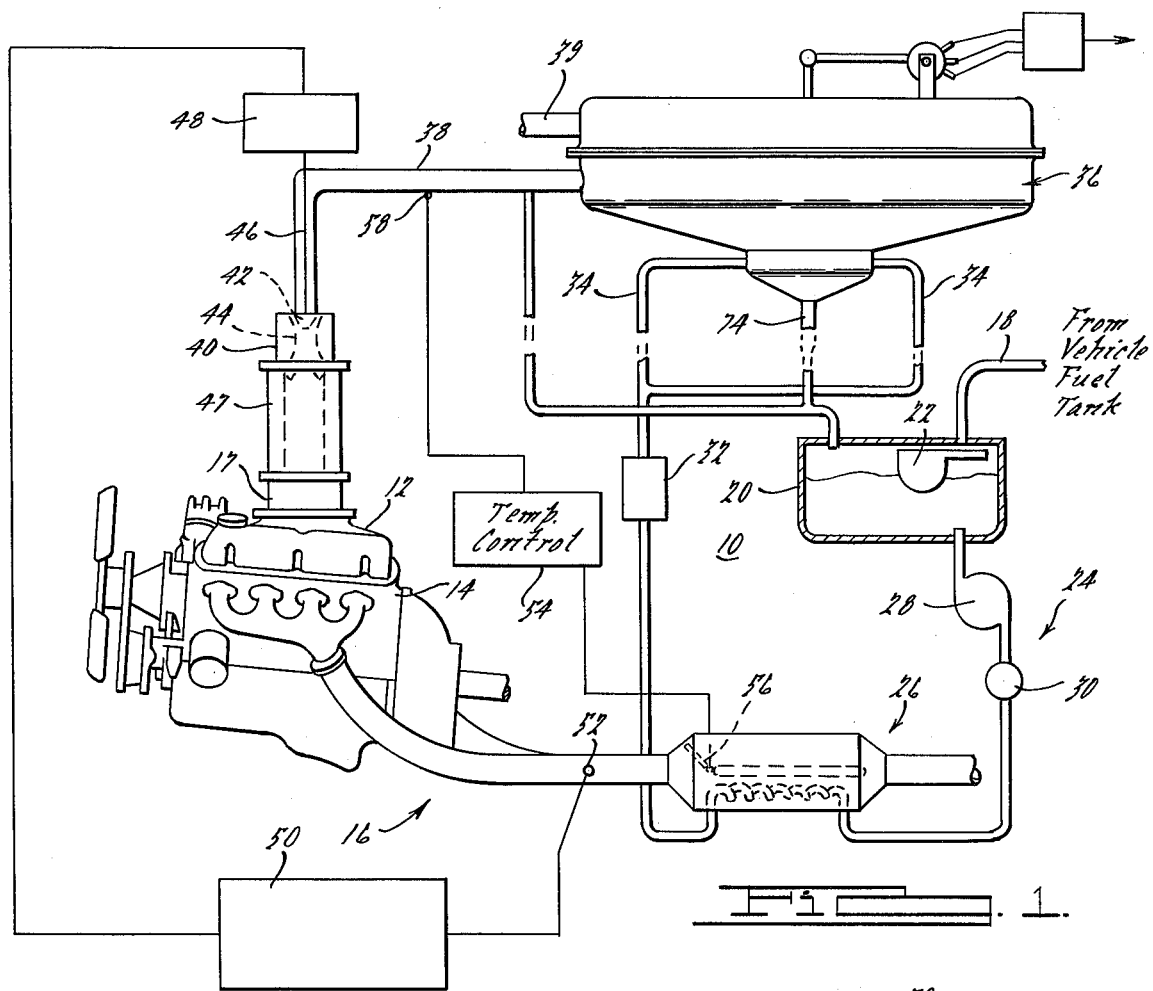
FIG. 1 illustrates the vaporized liquid fuel delivery and metering system with which the present invention is of utility.

Referring now to the drawing wherein like numerals designate like structure throughout the various views thereof, FIG. 1 illustrates a vaporized liquid fuel delivery and metering system 10 including the vapor pressure regulator according to the present invention. The vaporized liquid fuel delivery and metering system 10 is arranged to provide a combustible mixture to the intake manifold 12 of an internal combustion engine 14. Internal combustion engine 14 is provided with combustion by-product exhaust gas conduit means 16. Intake manifold 12 is provided with throttle body 17. As illustrated, internal combustion engine 14, intake manifold 12, throttle body 17 and exhaust gas conduit means 16 are substantially conventional. For purposes of illustration, it will be considered that internal combustion engine 14 is of the type adapted for installation and use in powering an automotive vehicle, not shown.

System 10 is arranged to receive liquid fuel from a conventional liquid fuel reservoir or tank, not shown, through conduit 18. Conduit 18 communicates with intermediate liquid fuel reservoir 20. The communication between conduit 18 and intermediate reservoir 20 may be controlled, for example, by a pivoted float valve 22 in the conventional manner. As will be appreciated, liquid fuel could be pumped through conduit 18 by conventional pumping means such as the conventional mechanical or electrical fuel pump normally used in automotive vehicles.

Liquid fuel contained in intermediate reservoir 20 may be provided by coarse fuel delivery means 24 to primary heating means 26. Coarse fuel delivery means 24 may include for example, an electrical or mechanical liquid pump 28 and a liquid control valve 30. This structure is described in somewhat greater detail hereinbelow with reference to FIG. 3. An auxiliary heating means 32 is arranged in fluid serial flow relationship with respect to the primary heating means 26 so that fuel provided from intermediate reservoir 20 will flow serially through the primary heating means 26 and thence through auxiliary heating means 32. The auxiliary heating means 32 are shown to be communicated via conduits 34 to a vapor storage reservoir and regulator 36 according to the present invention. Vapor reservoir 36 is described in greater detail hereinbelow with reference to FIG. 2.

As illustrated in FIG. 1, the primary and auxiliary heating means 26, 32 are connected in serial fluid flow relationship. In order for efficient operation of the auxiliary heating means 32, it should be designed for relatively low fuel flow consonant with operation of the associated engine at idle. As such, however, the auxiliary heating means could present a high impedance to fluid flow and could impede engine operation under high fuel consumption conditions. It is therefore contemplated that the primary and auxiliary heating means could be connected in parallel fluid flow. It is also contemplated to provide a fluid by-pass valve downstream from to primary heating means 26 and upstream from the auxiliary heating means 32 to place the primary heating means 26 in direct fluid communication with the vapor reservoir 36 when the auxiliary heating means 32 are not required as a vapor supply source.

Vapor reservoir 36 is communicated by way of conduit 38 with carburetor means 40. As used herein "carburetor" means any device for mixing fuel with air to establish a combustible air/fuel mixture. As illustrated in FIG. 1, the vapor delivery nozzle 42 of vapor delivery conduit 38 is positioned within the low pressure zone formed by the metering venturi means 44 of the carburetor means 40. A movable pintle 46 is situated within the vapor delivery nozzle 42 and is controlled by servomechanism means 48. Carburetor means 40 includes mixing section 47 which intercommunicates the metering venturi means 44 with the intake manifold 12.

Servomechanism 48 may be for example a conventional servomotor operated electrically or by electromechanical means. Servomechanism 48 receives an input command signal from servomechanism control means 50. As here illustrated, servomechanism control means 50 are arranged to be responsive to an exhaust gas sensor 52 which may be for example, a titania exhaust gas sensor according to U.S. Pat. No. 3,886,785. According to FIG. 1, fuel delivery and metering system 10 is also provided with vapor temperature control means 54. Temperature control means 54 are arranged to be responsive to the vapor temperature in vapor delivery conduit 38 in order to control an exhaust gas flow diverter valve 56. Valve 56 is operative to control heating of the primary heater means 26.

Figure 2:
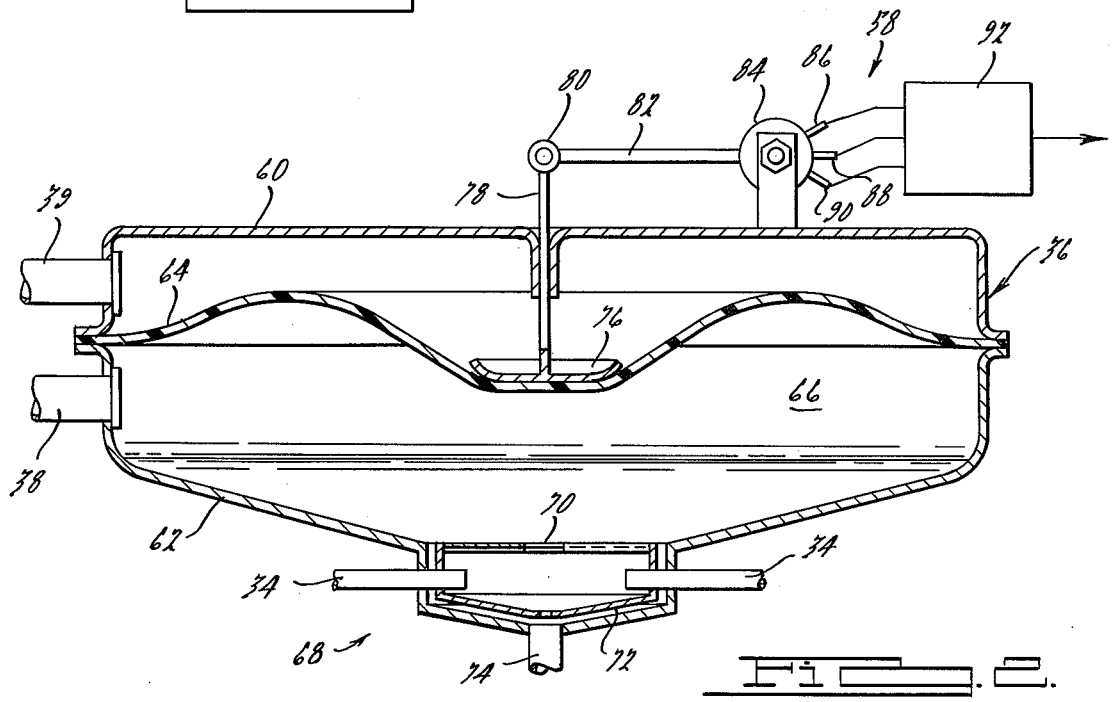
FIG. 2 illustrates the vapor reservoir according to the present invention in a partly section, partly diagrammatic view.

Referring now to FIG. 2, the vapor reservoir 36 and its associated vapor pressure control means 58 according to the present invention are illustrated. Vapor reservoir 36 is comprised of a canister or housing having upper and lower housing sections 60, 62, respectively. A movable wall member 64 is sealingly confined between extending flanges of the upper and lower canister housing sections 60, 62 to define a vapor tight vapor space or storage zone 66. Movable wall means 64 may be formed as a diaphragm member and may be fabricated from any suitable, flexible, high temperature and vapor resistant material. Movable wall means 64 may be, for example, in the case of vaporized liquid gasoline, a polytetrafluoroethylene (PTFE) material. Other materials are known and can be used. PTFE material has a maximum operating temperature in the contemplated environment of about 600° F while commercially available gasoline may be expected to be completely vaporized at temperatures not exceeding 450° F. A suitable thickness for such a diaphragm member has been found to be 2 mils. Smaller thicknesses are also suitable, provided that manufacturing induced defects such as perforations are avoided.

Lower canister housing section 62 is provided with a downwardly extending vapor inlet and condensate collection section 68. Vapor delivery conduits 34 are arranged to direct a vapor stream into the interior of section 68 where the vapor may communicate through swirl fins 70 with the vapor storage zone 66. A shield member 72 is received within section 68 and is attached to and supported by vapor inlet tubes 34. Condensate collection section 68 is provided with a generally downwardly extending generally conical and plate member having condensate collection conduit 74 affixed thereto at its lowest point. Shield member 72 is arranged to be spaced away from the walls of condensate collection section 68 and to be thermally floating with respect to the lower housing member 62 and the condensate collection section 68. Shield member 72 is arranged to provide a barrier between the relatively high temperature inlet vapor and the lower temperature condensate collection section 68 and any condensed fuel which may be accumulated therein. Preferably, shield member 72 is fabricated out of a low thermal inertia material such as a thin stainless steel or a suitable ceramic. Swirl fins 70 promote intermixing of the higher temperature inlet vapor with any vapor residual within vapor zone 66 to encourage relatively uniform temperature distribution within zone 66. In operation, any vaporized fuel which would condense due to contact with a low temperature surface within the vapor reservoir 36, and particularly the less volatile fractions of gasoline, would be collected within section 68 and would flow through condensate return conduit 74 for return to the intermediate tank 20.

A suitably sized vapor reservoir has been found to approximately one-half the displacement of the associated engine as such displacement is conventionally determined. Assuming that the force exerted by the position sensing means is 0.015 pounds and the accurate maintenance of the air/fuel ratio will tolerate a maximum pressure differential of 0.0001 pounds per square inch (induced by the position sensing means) the area of the movable wall member 64 must be at least 75 in.[2]. For a circular movable wall member 64, a diameter of about 10 in. is adequate. Thus, the overall height of the vapor reservoir need not exceed about 5 in. In arriving at the volume requirement, we have considered the extreme case to be an acceleration of the engine from about 600 RPM to about 3600 RPM in three seconds with the air-to-fuel ratio held at 15:1 and a volumetric efficiency of 80%. We have also considered the availability of vapor from the primary heater means 26 to be capable of providing about one-half of the vaporized fuel required by the engine in undergoing the aforenoted acceleration.

The central portion of movable wall means 64 is connected to plate member 76. Plate member 76 is connected to movable position sensing rod 78. Position sensing rod 78 is pivotally connected at pivot 80 to lever arm 82 of rheostat member 84. Rheostat member or potentiometer 84 is provided with three electrical terminals 86, 88 and 90 which communicate with the vapor volume control means 92.

Vapor region 66 communicates with the engine 14 through vapor conduit 38. Reference conduit 39 communicates the upper housing section 60 and particularly the nonvapor surface of movable wall means 64 with the source of air being utilized by internal combustion engine 14. In those instances where the air being ingested by engine 14 passes through an air cleaner, conduit 39 would preferably communicate with the interior of the air cleaner. In those instances where atmospheric air is provided directly to internal combustion engine 14, reference conduit 39 would communicate directly to the atmosphere. Reference conduit 39 thus provides the nonvapor side of movable wall portion 64 with a pressure reference which is substantially identically equal to the pressure of the air being provided to, and immediately upstream from, carburetor means 40.

Referring now to FIG. 3, the vapor volume control means 92 of FIG. 2 is illustrated as an electronic circuit. Vapor volume control means 92 is adapted to control valve 30 of coarse liquid fuel delivery means 24 in response to the quantity of vapor within vapor region 66 as indicated by potentiometer 84. In the presently preferred embodiment of the vaporized liquid fuel system, liquid fuel delivery means includes metering valve 30 which is a commercially available electrically controlled injection valve used, for example, in electronic fuel injection systems. Such valves are designed and intended to deliver a metered quantity of liquid fuel to the intake manifold of an internal combustion engine in proximity to an intake valve. It will be appreciated that a fuel pump means 28 could be similarly controlled to coarsely meter liquid fuel delivery to the heating means. Vapor volume control circuit 92 includes a first circuit portion, contained within dashed line 94, for generating a saw tooth wave form for application to one input terminal 96 of a comparator 98. The other input terminal 100 of comparator 98 is arranged to receive a variable voltage signal from control circuitry 102. This variable level voltage signal is generated in response to potentiometer 84. Valve control circuitry 104 is responsive to the output signal from comparator 98 appearing at output terminal 106 to selectively energize the liquid fuel delivery coarse metering valve 30.

Saw tooth generator 94 includes a ramp generator portion 107 which is operative to generate a linearly increasing voltage across capacitor 108. Capacitor 108 is charged by current flow from the terminal 110 through resistor 112 and transistor 114. Transistor 114 is held in an "on" or conductive condition by the voltage divider comprised of a pair of resistances 116, 118, which may be, for example, of the same resistance value. Resistances 116, 118 are operative to apply a reduced voltage such is approximately one-half of the input voltage to the base terminal of transistor 114. Transistor 114 will be conductive and will charge capacitor 108 whenever the voltage on the base terminal exceeds the voltage on the collector terminal and is less than the voltage on the emitter terminal. The rate of change of capacitor 108 can be controlled by the magnitude of resistance 112.

Capacitor 108 intercommunicates the collector of transistor 114 to ground. The other or nonground side of capacitor 108 is communicated by conductor 120 to output terminal 122 of transistorized gate circuit 124. One input terminal of transistorized gate circuit 124 is provided with a constant voltage signal derived from a conventional voltage divider 126 through resistance 128. Voltage divider 126 is connected electrically between terminal 130 and the ground and is operative to provide a constant voltage signal at input terminal 132. For purposes of this circuit description, voltage terminal 110 may be considered to represent a first level of voltage and voltage terminal 130 may be considered to represent a second level of voltage with all similarly designated terminals being in electrical communication with the same voltage source. Transistor 114 is arranged to act as a constant current source in charging capacitor 108. The voltage across capacitor 108 will increase substantially linearly until a value is reached which would reverse bias the base-collector junction of transistor 108 causing the transistor to switch off.

Input terminal 134 of transistorized gate circuit 124 receives a periodically repeated voltage pulse signal, such as at 136, which is generated by oscillator circuit 138. Oscillator circuit 138 is electrically energized from a voltage terminal 110. Oscillator circuit 138 is operative to generate a voltage pulse which goes from substantially the ground level to substantially the value of the source voltage and has a very narrow pulse width. The occurrence at input terminal 134 of a pulse having a voltage value which is in excess of the voltage value of the generally constantly applied voltage appearing at terminal 132 will be operative to cause the output of transistorized gate circuit 124 to approach ground value. This will impose a substantially ground voltage on conductor 120 to thereby discharge capacitor 108. Removal of the pulse from input terminal 134 will allow capacitor 108 to recharge. Thus, a saw tooth voltage signal going from a near ground or zero value to a maximum or full value voltage will be applied to terminal 96 of comparator 98. The pulse width of the output signal generated at output terminal 106 by comparator 98 will then be a function of the voltage appearing on input terminal 100.

The oscillator circuit 138 includes unijunction transistor 140 and associated circuitry operative to generate a pulse train at circuit junction 142. The associated circuitry includes variable resistance 144 and capacitor 146 arranged in an RC network and operative to periodically charge and discharge the capacitor 146 to cause breakdown of the unijunction transistor 140. The pulses appearing at circuit junction 142 may be shaped by additional circuitry associated with transistors 148, 150 to establish the pulse train of pulses 136 having a generally uniform pulse width with rapid rise and fall. Resistance 144 is here shown to be variable in order to vary the frequency of the resulting pulse train. We have found that a pulse frequency of 50 Hz and a pulse width of 0.1 usec. gives good results.

The potentiometer 84 is connected by its terminals 86, 90 between a voltage terminal, such as terminal 130, and ground. The slider 88 of potentiometer 84 is coupled to the movable wall member 64 of vapor reservoir 36 as described hereinabove with reference to FIG. 2. The voltage developed by potentiometer 84 at slider 88 is therefore a function of the position of the position of the movable wall member 64 and hence of the quantity of vapor within the vapor region 66. This voltage is applied to one input terminal 160 of comparator 162 to be compared with a reference voltage applied at input terminal 166. The reference voltage is developed by potentiometer 164. Comparator 162 is arranged to provide an output signal at output terminal 168 which signal represents the difference between the applied input signals. The output signal appearing at output terminal 168 is applied through potentiometer 170 to the input terminal 100 of comparator 98.

The input terminals 160, 166 of comparator 162 are provided with input resistances 174, 176 respectively. In addition, variable feedback resistance 178 and capacitor 180 are arranged electrically in parallel interconnecting input terminal 160 with output terminal 168. The ratio of the resistance of feedback resistance 178 compared with the resistance of input resistance 174 will establish the gain of the comparator and the gain so established can be expected to be stable in extended use. Capacitor 180 is selected to prevent relatively high frequency variations in the voltage appearing at output terminal 168. This is desirable to prevent a relatively high frequency instability in the closed loop which includes the "mechanical" elements of the primary heater means 26 and the vapor reservoir 36. For good d.c. stability, the values of resistance of the input resistances 174, 176 are selected to be substantially equal. The value of the grounding resistance 182 is also selected to be approximately equal to the value of the feedback resistance 178 for good d.c. stability.

With potentiometer 84 disconnected, potentiometer 164 is adjusted to make the voltage at output terminal 168 sufficiently high to just provide maximum fuel delivery to the primary heater means 26. Potentiometer 84 is then connected and adjusted, with the movable wall portion 64 in a down, or vapor depleted condition, so that the voltage at output terminal 168 is as previously set. Feedback resistance 178 is then adjusted to give a zero output voltage at output terminal 168, corresponding to the vapor reservoir being filled, by holding the vapor reservoir movable wall portion in an up or "filled" condition. As illustrated in FIG. 2, a depleted vapor supply in reservoir 36 will cause the voltage appearing at input terminal 160 to decrease. The voltage appearing at output terminal 168 is arranged to increase as the voltage at input terminal 160 decreases from the reference level established by potentiometer 164.

Potentiometer 170 is connected between output terminal 168 and ground. The slider 172 of potentiometer 170 is connected to the input terminal 100 of comparator 98. The slider 172 may also be connected to the apparatus controlling the position of the throttle valve within throttle valve body 17. For example, a closed throttle condition would cause the slider to reduce the level of the voltage signal applied to input terminal 100. This arrangement will operate to vary the effective gain of comparator 162 in response to actual operation of internal combustion engine 14 to assist in filling the vapor reservoir when the throttle valve of the engine is opened and to assist in preventing excess vapor formation when the throttle valve is moved toward a closed position. Potentiometer 170 will also assist in preventing relatively low frequency instability in the loop which includes primary heater means 26 and vapor reservoir 36.

Comparator 98 is arranged to generate an output voltage signal at output terminal 106 whenever the voltage appearing on input terminal 96 is below the level of voltage established at the input terminal 100. Thus, with a saw tooth input signal at input terminal 96, a pulse train of rectangular pulses will be generated at output terminal 106 with a frequency equal to the frequency of the saw tooth wave train and a pulse width determined by the portion of any particular saw tooth pulse which is below the threshold voltage. The output signal will be applied to output transistor 184 which will invert the signal to apply an input to the power amplifier circuitry 186 to control energization of the coarse fuel metering valve 30. Thus, when vapor reservoir 36 is full, the threshold signal will be substantially zero and the output signal at terminal 106 will be substantially constant at the zero level. This will turn output transistor 184 "off" thereby applying a high voltage signal to power amplifier 186 causing power amplifier 186 to be "off". This will result in closing coarse fuel metering valve 30 and terminating fuel delivery to the primary heating means 26. As the vapor is depleted from vapor reservoir 36, the threshold signal will rise causing the output signal to appear as a train of pulses at the saw tooth frequency. The pulse portion of the output signal pulse train will switch output transistor 184 "on" and will cause the power amplifier to be "on" to energize coarse fuel metering valve 30. With valve 30 on or open, additional quantities of liquid fuel will be allowed to flow to the primary heater means 26 for vaporization thereby. For very low volumes of vapor in vapor reservoir 36, the threshold signal will be high and the pulse width will increase thereby increasing the "on" time of power amplifier 186 and the open time of coarse fuel metering valve 30.

Referring now to FIGS. 1, 2 and 3, it can be seen that carburetor means 40 is provided with means defining a substantially conventional metering venturi 44. Vapor conduit 38 is provided with vapor delivery nozzle 42 which is situated within the metering venturi 44 of the carburetor means 40. Vapor conduit 38 is arranged to place the orifice of vapor delivery nozzle 42 within the low pressure region established by the metering venturi 44. In this embodiment, metering venturi 44 is arranged to define an air flow passage which is rapidly convergent on its upstream side and gradually divergent on its downstream side. The terms "upstream" and "downstream" relate to the direction of intake air flow.

As a coarse measure of air/fuel ratio control, the ratio of the area of the venturi 44 in the plane of the orifice of vapor delivery nozzle 42 when compared to the area of the orifice of the vapor delivery nozzle 42 should be slightly less than that which would produce the desired air/fuel ratio. We have determined that the air/fuel ratio is approximately equal to seven tenths (0.7) of the ratio of the air delivery area compared to fuel delivery area. This relationship is an approximation and is based on air at 70° F. and commercially available gasoline, as the fuel, vaporized at 400° F. By modulating the actual area of fuel delivery, through use of a movable pintle and needle valve, for example, the actual air/fuel ratio may be modulated and a desired air/fuel ratio may be precisely attained. In view of the fact that fuel vapor is provided to the moving air stream with substantially the same pressure differential through the orifice of vapor delivery nozzle 42 as is experienced by the air stream in flowing from the upstream side of metering venturi 44 to the plane of the orifice of nozzle 42 and is delivered to the low pressure region defined by the air stream moving through metering venturi 44, the mass of vaporized liquid fuel can be precisely controlled to match the mass of air being consumed by the associated engine to maintain a preselected and desired air/fuel ratio for all mass ratios of air flow.

The precise area of the orifice of fuel delivery nozzle 42 may be varied by the movement of pintle 46 in order to vary the area of the fuel delivery nozzle and hence the quantity of vaporized liquid fuel being provided to the engine through vapor delivery conduit 48. A throttle valve situated within throttle body 17 may be operative to vary the rate of delivery of the combustible air/fuel mixture to the intake manifold of engine 14 from the carburetor means 40. The throttle valve may be operated in the conventional manner. Preferably, the orifice of vapor delivery nozzle 42 will be placed within the region defined by metering venturi 44 at or within the zone of maximum depression (minimum pressure) in order to provide the greatest pressure differential across the orifice. However, accurate placement within the low pressure zone is not critical since the vapor pressure is referenced to substantially the same pressure as exists upstream from the metering venturi 44 and the size of the minimum pressure zone defined in the direction of flow is variable.

We claim:

1. A reservoir for storage of a vaporized fuel which is liquid at standard temperature and pressure comprising in combination:

housing means;

movable wall means received within said housing means cooperative with said housing means to define a variable volume vapor storage zone;

inlet fluid conduit means communicating in fluid tight relation with said vapor storage zone;

outlet fluid conduit means communicating in fluid tight relation with said vapor storage zone;

said inlet fluid conduit means operative to communicate said vapor storage zone with a source of vaporized liquid fuel and said outlet fluid conduit means operative to communicate said vapor storage zone with a vaporized liquid fuel utilization means;

reference means communicating the nonvapor side of said movable wall means with a preselected reference pressure whereby the vapor pressure may be arranged to have a predetermined relationship with respect to the reference pressure;

cup-shaped condensate collection means dependent from said housing means arranged for fluid communication with a reservoir of the liquid fuel;

said inlet fluid conduit means being attached to said condensate collection means whereby higher temperature inlet vapor from said inlet fluid conduit means may elevate the temperature of vapor within the lower portions of the vapor storage zone; and thermally floating separator means received within and spaced apart from said condensate collection means and supported by said inlet fluid conduit means operative to provide a thermal barrier between vapor flowing through said inlet fluid conduit means and condensed vapor.

2. The vapor reservoir according to claim 1 wherein said thermal separator means include a plurality of fin members in proximity to the outlet orifices of said inlet fluid conduit means operative to promote intermixing of inlet vapor with vapor residual within said vapor storage space.

3. A reservoir for storage of a vaporized fuel which is liquid at standard temperature and pressure comprising in combination:

housing means;

movable wall means received within said housing means cooperative with said housing means to define a variable volume vapor storage zone;

inlet fluid conduit means communicating in fluid tight relation with said vapor storage zone;

outlet fluid conduit means communicating in fluid tight relation with said vapor storage zone;

said inlet fluid conduit means operative to communicate said vapor storage zone with a source of vaporized liquid fuel and said outlet fluid conduit means operative to communicate said vapor storage zone with a vaporized liquid fuel utilization means;

reference means communicating the nonvapor side of said movable wall means with a preselected reference pressure whereby the vapor pressure may be arranged to have a predetermined relationship with respect to the reference pressure;

said movable wall means comprising a diaphragm member formed of a thin flexible material which is selected to be compatible with the vaporized liquid fuel;

electrical means responsive to the position of said diaphragm member operative to generate an electrical signal indicative of the quantity of vapor within said vapor storage zone; and electronic means responsive to said electrical signal operative to generate an electrical signal for application to liquid fuel delivery means for controlling the delivery of vapor to the vapor storage zone.

4. The vapor reservoir according to claim 3 wherein said electronic means comprise:

oscillator means for generating a periodically repeating voltage signal waveform;

variable threshold means responsive to said electrical signal operative to generate a variable voltage threshold signal;

comparison means for comparing said waveform and said threshold signal operative to generate an output signal for a selected relationship of said threshold signal and waveform; and output amplifier means responsive to said output signal operative to generate a liquid fuel delivery control signal whereby the delivery of liquid fuel to a vaporizer for charging said reservoir with a vapor may be controllably regulated.

5. The vapor reservoir according to claim 4 including:

electrical means within said threshold means and operatively associable with an engine throttle, operative to vary the threshold signal as a function of throttle position whereby the delivery of liquid fuel for vaporization may be increased or decreased in accordance with anticipated engine requiremnts as suggested by throttle position changes.

* * * * *